April 30, 1946.   E. C. WAHLBERG   2,399,272
ELECTRICAL DEVICE
Filed Jan. 24, 1942   5 Sheets-Sheet 2

INVENTOR.
Eric C. Wahlberg
BY Thomas C. Betts
His attorney

April 30, 1946.  E. C. WAHLBERG  2,399,272
ELECTRICAL DEVICE
Filed Jan. 24, 1942  5 Sheets-Sheet 5

INVENTOR.
Eric C. Wahlberg
BY Thomas C. Betts
His Attorney

Patented Apr. 30, 1946

2,399,272

UNITED STATES PATENT OFFICE 2,399,272

ELECTRICAL DEVICE

Eric C. Wahlberg, Stamford, Conn., assignor to Electrolux Corporation, New York, N. Y., a corporation of Delaware Application January 24, 1942, Serial No. 428,018

22 Claims. (Cl. 172—293)

My invention relates to electric devices and more particularly to electric motors of either alternating or direct current type.

One of the objects of my invention is to provide means for electrically bringing the armature of an electric device into angular alignment with a fixed point.

A further object of my invention is to provide, in combination with means for causing either direct or alternating current electric motors to run in synchronism, means for bringing the armature shafts of the several motors into accurate mechanical or electrical angular alignment before the motors are started to thereby assure that the motors will run in synchronism immediately upon starting. Thus, before the motors are started their shafts may be brought into alignment, and thereafter due to the synchronous operation of the motors, this alignment may be maintained during operation.

Another object of my invention is to provide an arrangement whereby a plurality of either direct current or alternating current motors may be caused to operate in synchronism, not only during the normal running of the motors, but also as they are slowing down to a stop.

A still further object of my invention is to provide an improved switching means for use in connection with the above.

Further objects and advantages of my invention will be apparent from the following description, considered in connection with the accompanying drawings which form a part of this specification and of which:

Figure 1:
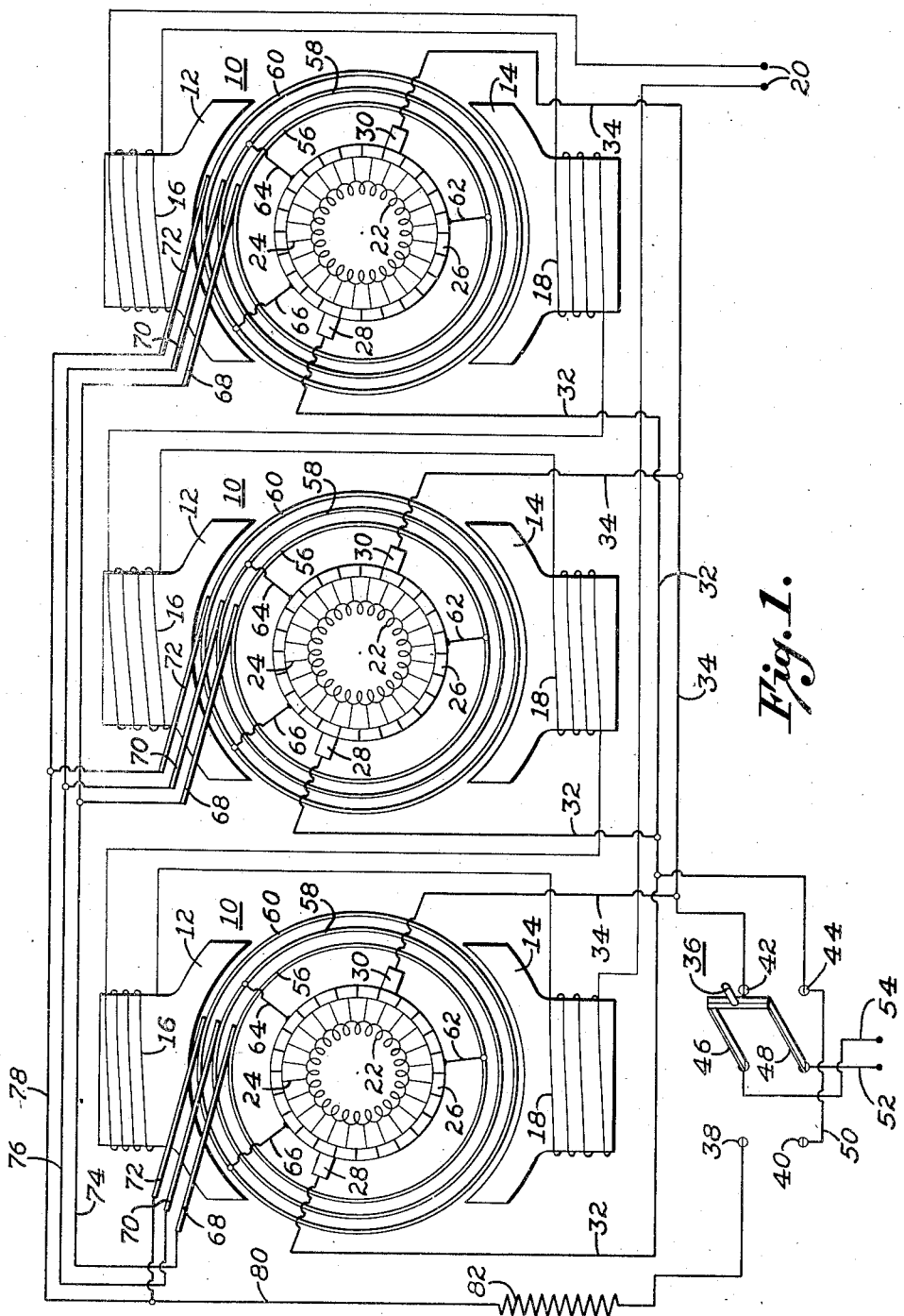
Fig. 1 is a wiring diagram illustrating one embodiment of my invention as applied to direct current motors.

Referring more particularly to Fig. 1, there is shown a plurality of direct current electric motors, designated generally by reference character 10. Inasmuch as the three motors are identical, the same reference characters will be employed to designate corresponding parts. Each motor includes diametrically disposed poles 12 and 14 carrying field windings 16 and 18, respectively. As shown, the windings 16 and 18 in each motor are connected in series and the fields of the several motors are also connected in series and supplied with excitation current from any suitable direct current supply 20.

Suitably mounted between the poles 12 and 14 is an armature including a winding 22 made up of a plurality of coils. Each coil is connected by means of a tap 24 with a segment of a commutator 26. Brushes 28 and 30 are associated with the commutator and are located on the neutral plane, in the usual manner. The armature windings of the several motors are connected through the brushes 28 and 30 in parallel by means of conductors 32 and 34. These conductors are supplied with direct current through a double-pole, double-throw switch 36.

As shown, this switch has four poles—38, 40, 42 and 44, and a pair of blades 46 and 48, poles 40 and 44 being connected together by means of a conductor 50. Direct current is supplied from any suitable source to the blades 46 and 48 by means of conductors 54 and 52 respectively. Conductor 32, which is connected to one brush 28 of each of the several motors, is also connected to the pole 44, while conductor 34 is connected to pole 42. Consequently, when the switch is closed in the right-hand position, current is supplied from the conductors 52 and 54 through the switch to the conductors 32 and 34 and through them to the armatures.

The armature of each motor carries three slip rings 56, 58 and 60, each slip ring being connected to a different commutator bar or armature tap through taps 62, 64 and 66, respectively. It is not necessary that the taps 62, 64 and 66 be equally distributed angularly around the armature winding, and in the wiring diagram the angular space between the taps 64 and 66 is less than that between either of these and the taps 62. Associated with the slip rings 56, 58 and 60 are brushes 68, 70 and 72, respectively. Corresponding brushes in the different motors are connected together by means of conductors 74, 76 and 78, respectively.

A conductor 80 is connected to any one of the three conductors 74, 76 or 78 and leads through a resistance 82 to the pole 38 of switch 36.

The above-described device operates as follows:

Assuming the switch 36 to be in open position, the motors will of course be at rest, inasmuch as no current is supplied to their armatures. If it is desired that the motors not only run in synchronism, but that the angular relationship of all the shafts be the same, the shafts are initially angularly aligned by exciting the field windings 16 and 18 and by throwing the switch 36 to the left-hand position. This supplies current from the line 54 through the blade 46 and conductor 80 to the brush 72. From here it flows through the slip ring 60 and tap 66 to the armature winding 22. Here the current divides and flows around the armatures in both directions to the brush 28 and thence through the conductor 32 to the pole 44 and through conductor 50 to pole 40 and thence through blade 48 to terminal 52, thus completing the circuit. The above-described flow of current through the armature creates a magnetic field having a center line bisecting the angle between the brush 28 and the tap 66. It will be assumed that field pole 12 is a north pole and the pole created in the armature between the brush 28 and the tap 66 is a south pole. Consequently, the armature will be turned in a clockwise direction, inasmuch as the north field pole attracts the south armature pole. As the armature is turned in this manner, the angle between the brush 28 and the tap 66 is increased and more of the armature windings are included therebetween. This causes the center line of the magnetic field in the armature to shift clockwise so as to always bisect the angle between the brush 28 and the tap 66, and this continues until this center line coincides with the center line of the field poles. The armature is thus magnetically locked in this position. If the tap 66 is initially on the opposite side of the center line of the field, the armature will be turned counter clockwise until the center lines coincide.

The same thing occurs in the armature of all the motors and consequently all the shafts are brought into angular alignment.

The motors are now started by throwing the switch 36 to the right-hand position, whereupon direct current is supplied to the brushes 28 and 30 through the conductors 32 and 34 and the armatures are caused to rotate in the usual manner. It is assumed that this rotation is in a counter-clockwise direction.

As is well known, the voltages generated within the armature conductors of a direct-current motor are alternating current voltages. Consequently, three-phase alternating current flows through the taps 62, 64 and 66 to the respective slip rings and thence through the brushes 68, 70 and 72 to the conductors 74, 76 and 78. The frequency and voltage of this current depend upon the speed of the armature. In the event that the armature of one of the motors tends to run slower than the other armatures, due for instance to an increased load, the frequency and voltage of the current produced by that armature become less than that produced by the others. Current will thereupon flow from the two other motors, acting as generators with respect to the three-phase circuit, to the slower running motor and will bring that motor into synchronism with the other two. In other words, the three-phase circuit causes the motors to operate as synchronous machines, the machine which has a tendency to run slower acting as a synchronous motor and the others as generators. In this way, the three motors are caused to operate at exactly the same speed, although that speed is not necessarily constant. Thus, an increase in load on all of the motors will cause all of them to slow down. Likewise, an increase in load on less than all of the motors would cause all of them to slow down a certain amount.

If it is desired to maintain the armature shafts of the several motors in synchronism as they are stopped and to stop them in angular alignment, the switch 36 is again thrown to the left-hand position. As soon as the blades 46 and 48 of the switch break contact with the poles 42 and 44, respectively, the armature circuit is opened and the motor ceases to produce torque. However, the inertia of the armatures would cause them to coast until brought to rest as a result of friction in the bearings and the resistance offered by the load. Inasmuch as the loads and the friction acting on the different motors may be different, the several armatures would be apt to coast different numbers of revolutions. While the three-phase circuit serves to hold the armatures in synchronism at high speeds, after they have slowed down somewhat the current generated at the lower speeds is not sufficient to hold them in synchronism if the resistance to rotation is different for the different armatures.

However, if the switch 36 is thrown to the left-hand position, direct current is caused to flow through the tap 66 and the brush 28, as previously described. This produces a magnetic field in the rotating armature with the result that an alternating current is generated in the stationary field windings. This current is short circuited through the machine supplying direct current to the terminals 20 and produces dynamic braking. At the same time an alternating current is generated in the armature windings, due to rotation of the armature relative to the excited field, and this current is short circuited through the machine supplying direct current to the brush 28 and tap 66, producing an additional dynamic braking effect. Consequently, the armature is rapidly decelerated, but this braking itself does not tend to stop the armature at any particular angular position.

However, if it is assumed that the dynamic braking effect stops the armature with the tap 66 in the position shown in Fig. 1, a magnetic field is created in the armature having a center line midway between the brush 28 and the tap 66, with the south pole at this side of the armature. This south pole is attracted by the north field pole 12, and the armature is turned clockwise until the center line of this field is aligned with the center line of the field coils, as previously described in connection with the initial positioning of the armature. Likewise, if the armature is stopped by dynamic braking in any other position it will be angularly positioned in the same manner as explained for initial positioning.

The same thing occurs in all of the motors. If during the deceleration the resistance to rotation of one of the motors is greater than that of the others, which would tend to stop it after a lesser number of revolutions, the application of direct current to the tap 66 of each motor while the motors are still rotating in synchronism holds them in synchronous deceleration because, the alternating currents generated in the field windings of the respective motors, previously described in connection with the dynamic braking, are in phase as long as the motors rotate at the same speed. However, if one motor starts to get out of step, the current generated in its field winding is out of phase with that generated in the other field windings. This results in flow of current from the faster motor to the slower one and the motors are in this way brought back to synchronous speed.

Consequently, the armatures of the several motors rotate the same number of revolutions during the deceleration period and come to rest with their shafts in angular alignment.

Figure 2:
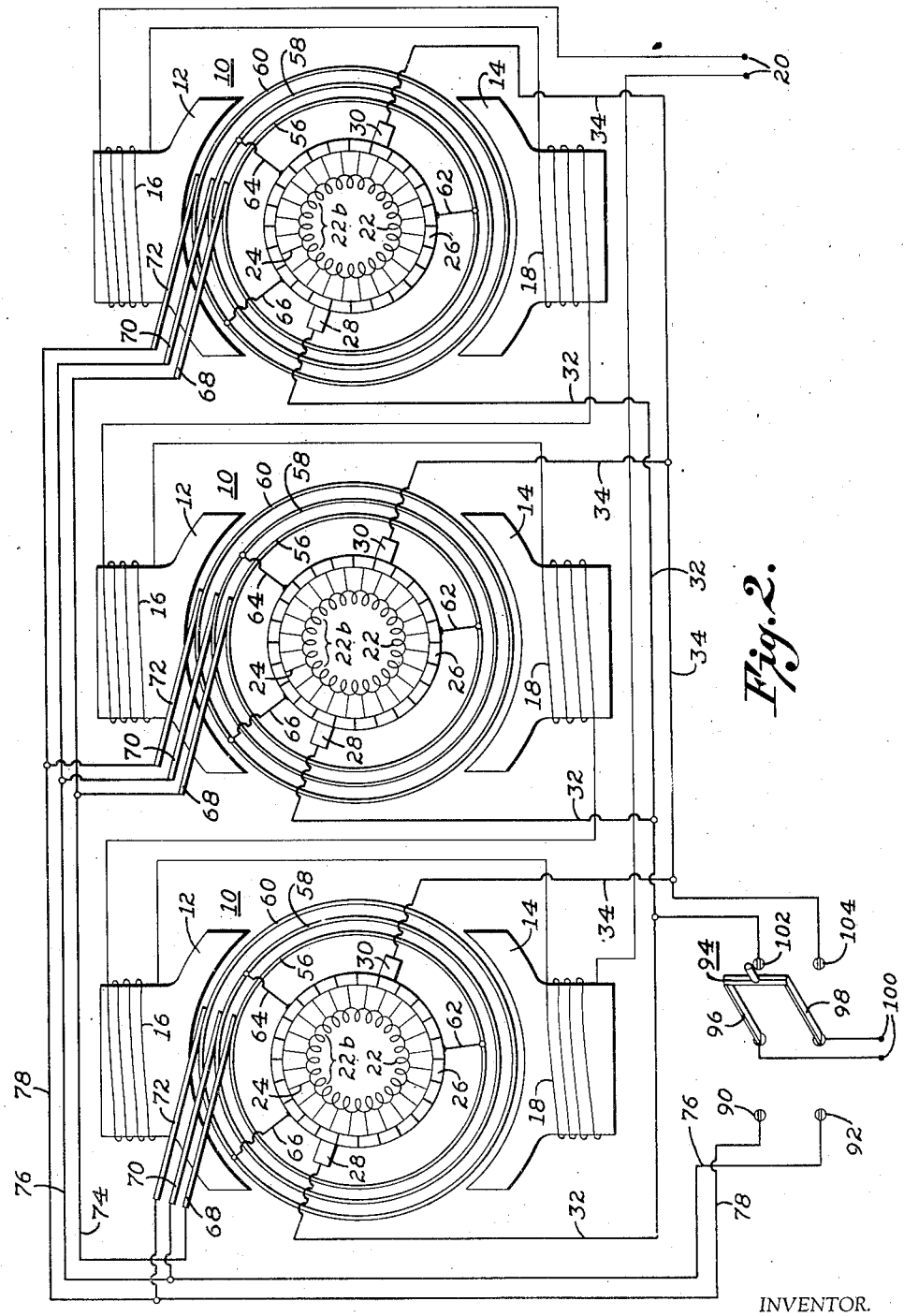
Fig. 2 is a wiring diagram illustrating a second embodiment of my invention as applied to direct current motors.

In the embodiment of my invention illustrated in the wiring diagram of Fig. 2, there is shown another means for bringing the several armature shafts into angular alignment either before the motors are started or after they are stopped. The motors 10 are exactly the same as those illustrated in Fig. 1, and the three-phase circuit including the conductors 74, 76 and 78 is the same. However, two of these conductors, for instance conductors 76 and 78, are connected to the poles 92 and 90, respectively, of a double-pole, double-throw switch 94. The blades 96 and 98 of this switch are connected to a suitable D. C. supply 100. The other two poles 102 and 104 are connected to the conductors 32 and 34 which supply current to the armature brushes 28 and 30.

The operation of the above-described device is as follows:

In order to align the armature shafts of the several motors, the switch 94 is closed in the left-hand position. A direct current circuit is thus provided through the conductor 78, brush 72, slip ring 60, tap 66, part 22b of the armature winding 22, tap 64, slip ring 58, brush 70 and conductor 76. The current flowing through this circuit produces north and south poles in the armature. Inasmuch as the field coils of the motors are excited, the magnetic force rotates the armatures until the part 22b of the armature coils is in alignment with the pole having opposite polarity from that of section 22b, which is assumed to be pole 12. Thus, all of the armature shafts are brought into angular alignment. Due to the fact that, in this embodiment, the part 22b of the armature winding always contains the same number of turns, regardless of the angular position at which the armature may have come to rest, it is not necessary to provide a resistance, such as that designated by reference character 82 in Fig. 1, in order to avoid the possibility of a short-circuit.

As soon as the armatures have been aligned, the switch 94 is thrown to the right-hand position, whereupon current is supplied in the usual manner to the armatures and the several motors develop torque and hence the armatures are caused to rotate.

The three-phase circuit including the taps 62, 64 and 66, the slip rings 56, 58 and 60, the brushes 68, 70 and 72 and the conductors 74, 76 and 78 cause the armatures of the motors to run in synchronism in exactly the same manner as described above in Fig. 1, inasmuch as these circuits in the two figures are the same.

When it is desired to stop the motors, the switch is again thrown to the left-hand position, with the result that two poles are produced in the armature, as above described, thus giving in effect a rotating magnet between the two fixed poles. Consequently, the part 22b tends to stop in alignment with the pole 12. The braking effect thus produced in most cases would not be sufficient to immediately bring the armature to rest, inasmuch as inertia would carry the part 22b past the pole 12, probably a plurality of times. However, the dynamic braking effect as described in connection with Fig. 1, rapidly decelerates the motors until the attraction between the field pole 12 and the pole in the armature between the taps 64 and 66 is able to stop the armature in proper alignment. During deceleration, the armatures of the various motors are held in step, chiefly as a result of the alternating currents generated in, and circulating between the field windings of the respective motors. Consequently, all the armatures remain in synchronism until they are stopped, and all stop with the respective portions 22b in alignment with the poles 12. Therefore, it is assured that the several armature shafts make exactly the same number of revolutions and stop in exact angular alignment.

Figure 3:
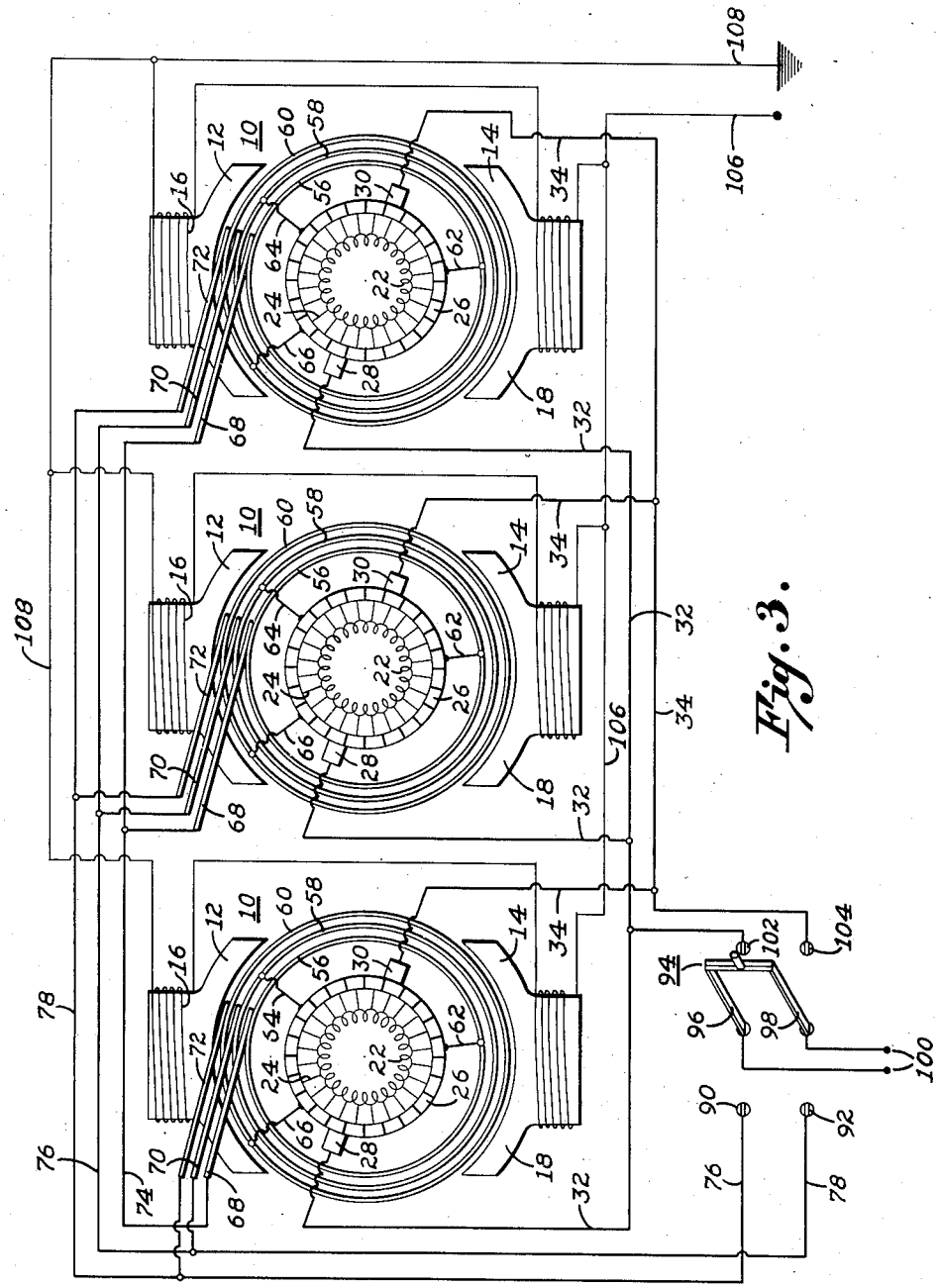
Fig. 3 is a wiring diagram illustrating a third embodiment of my invention as applied to direct current motors.

The embodiment illustrated in Fig. 3 differs from that shown in Fig. 2 only with respect to the manner in which the field coils of the several motors are connected. In Fig. 2 the fields of the different motors were all connected in series, whereas in Fig. 3 the coils 16 and 18 of each motor may be in series or parallel, as is well known, and are shown in series, but these coils are connected in parallel with the field coils of the other motors. Excitation current is supplied to the conductors 106 and 108, and the field coils of the different motors are connected in parallel between these conductors.

This embodiment normally operates in exactly the same manner as does that shown in Fig. 2. However, it has the advantage that if the field circuit of any one of the motors is inadvertently opened during operation, it would not result in depriving the other motors of excitation current. Consequently, a motor with the open field circuit would stop, but the others would continue to operate, whereas in the embodiment illustrated in Figs. 1 and 2, an open field circuit in any one motor would cause all of them to stop. For certain applications, however, this may be a desirable feature.

In any of these embodiments the supply of armature current to one of the armatures could fail without stopping that motor. Under such conditions the other motors would operate as generators with respect to the three-phase circuit and drive the first-mentioned motor in synchronism as a three-phase synchronous motor.

Figure 4:
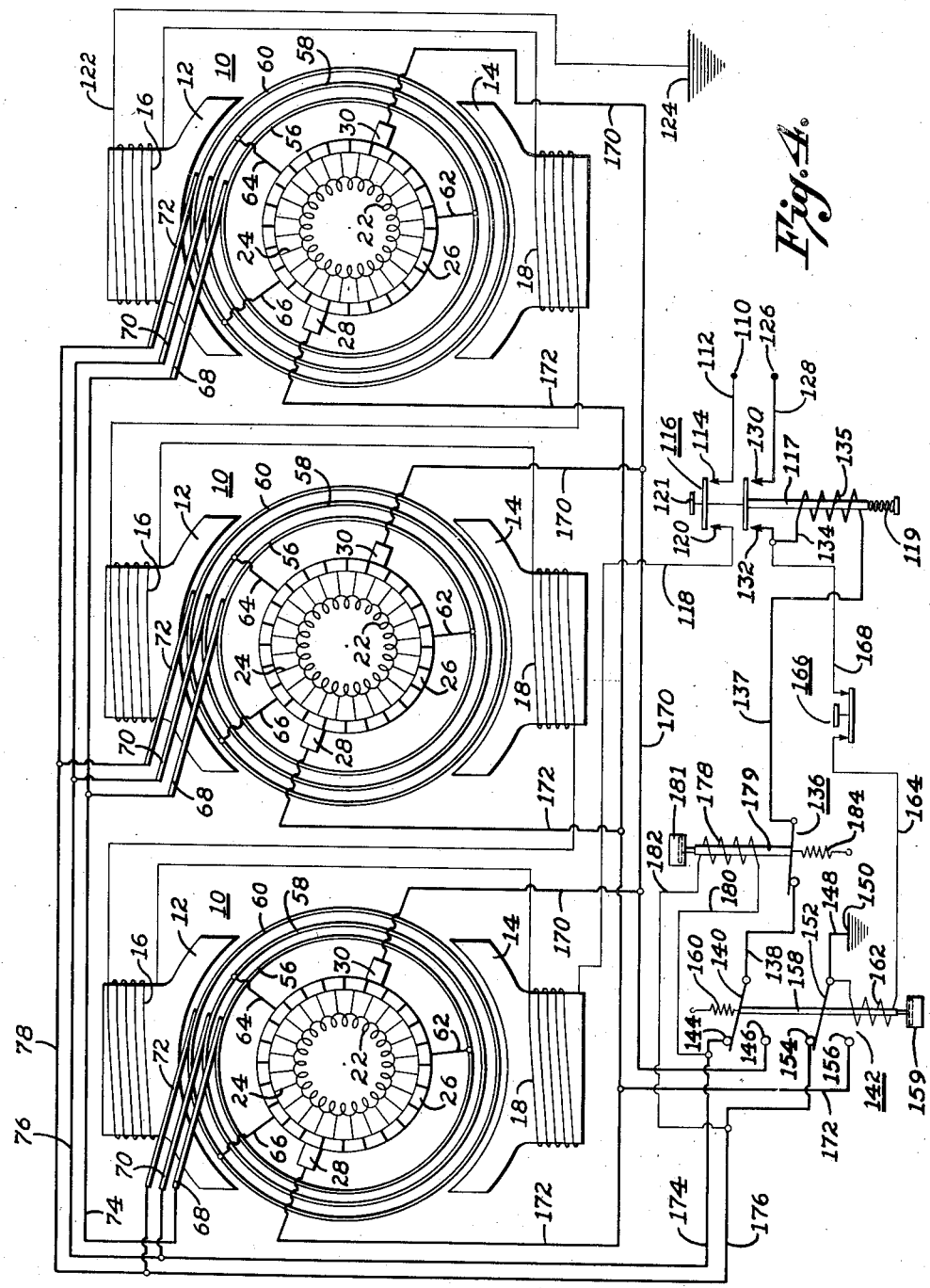
Fig. 4 is a wiring diagram illustrating improved switching means.

In the embodiment illustrated in Fig. 4, there is shown an improved switching arrangement for use in connection with the embodiments illustrated in either Fig. 2 or 3. In Fig. 4, the constructions of the motors and connections therebetween are the same as shown in Fig. 2 and consequently need not be described again.

Reference character 110 designates one terminal of a field circuit to which is connected a conductor 112. This conductor leads to one pole 114 of a double-pole, single-throw magnetically operated switch, designated generally by reference character 116. Switch 116 includes a plunger 117 which is urged upwardly by means of a compression spring 119. The plunger is provided with a button 121 by means of which it may be pushed down against the force of the spring, and with a holding coil 135 for retaining it in this position. A conductor 118 is connected to the pole 120 of this switch and leads to the field coil 18. The field coils of all the motors are connected in series and a conductor 122 leads from the field of the last motor in the circuit to the ground connection 124.

Reference character 126 designates one terminal of the armature circuit and is connected by means of a conductor 128 to the pole 130 of the switch 116. Pole 132 is connected by means of a conductor 134 to one end of the holding coil 135 of switch 116. A conductor 137 connects the other end of coil 135 to one terminal of a magnetically operated switch 136. A conductor 138 connects the other terminal of switch 136 with a blade 140 of a double-pole, double-throw magnetically operated switch 142. This blade may make contact with either of the poles 144 or 146. A conductor 148 leads from the ground connection 150 to the other blade 152 of the switch 142. This blade may make contact with either the pole 154 or 156.

The blades 140 and 152 are connected to a plunger 158 which is normally held in its uppermost position by means of the spring 160, in which position the blades make contact with the poles 144 and 154, respectively. A solenoid coil 162 is associated with the plunger 158 so as to draw the plunger downwardly against the force of the spring when the coil is energized. Any suitable quick return type of dashpot 159 is connected to plunger 158 and acts to retard downward motion of the plunger under the influence of coil 162, while permitting quick upward motion under the influence of spring 160 when the coil is de-energized. One terminal of the coil is connected to the conductor 148, while the other terminal is connected by means of a conductor 164 with one terminal of a push button type switch 166. The other terminal of this switch is connected by means of a conductor 168 with the conductor 134.

A conductor 170 is connected to pole 146 of switch 142 and leads to the brushes 30 of the several motors, while a conductor 172 is connected to the pole 156 and leads to the brushes 28 of the motors. A conductor 174 is connected to the pole 144 and leads to the conductor 76 of the three-phase circuit, while a conductor 176 connects pole 154 with the conductor 78 of this circuit.

Switch 136 is provided with a solenoid coil 178 which is connected by means of conductors 180 and 182 across the lines 174 and 176. The plunger 179 of this switch is urged downwardly by means of a spring 184, but this motion is retarded by a dashpot 181.

The above-described device operates as follows:

When it is desired to start the motors the switch 116 is closed by pressing down button 121. Consequently, field current flows from the conductor 112 through the terminals 114 and 120 of the switch to the conductor 118 and thus through the field coils to the conductor 122 and the ground connection 124.

Armature current flows from the conductor 128 through the terminals 130 and 132 of the switch 116 to the conductor 134 and through the holding coil 135, to thereby energize the coil and thus hold the plunger 117 down and the switch closed. From the holding coil the current flows through switch 136, which is normally closed, to the blade 140 of the switch 142. From here the current flows from the terminal 144 through the conductor 174 to the conductor 76 of the three-phase circuit, and thence through the brush 70, slip ring 58, and tap 64 to the armature winding 22 where it divides and flows around parallel paths through the winding 22 to the tap 66 connected to the slip ring 60, brush 72, conductors 78 and 176 to the terminal 154. From here the circuit is completed through the blade 152 and conductors 148 to the ground connection 150. This causes the armatures of the several motors to be turned into angular alignment in the same manner as described in Fig. 2.

The closing of switch 116 also causes current to flow through the conductor 168, the normally closed switch 166 and the conductor 164 to the solenoid 162 of the switch 142. The energizing of this solenoid tends to move the switch to its other position, but this action is delayed by the dashpot 159 for a sufficient length of time to allow the armatures to be turned into angular alignment. At the same time coil 178 of switch 136 is energized and tends to open this switch. However, this is delayed by the dashpot 181, which is so selected as to be slower acting than the dashpot 159 of switch 142. Therefore, the latter switch is shifted before switch 136 opens so that the blade 140 contacts the terminal 146 and the blade 152 contacts the terminal 156, thus supplying armature current through the conductors 170 and 172 to the brushes of the several motors, and cutting off the supply of current to conductors 174 and 176 and hence de-energizing coil 178. The motors now operate in the normal manner and the three-phase circuit holds them in synchronism, as has been previously described.

When it is desired to stop the motors, the push button switch 166 is opened, thus de-energizing the holding coil 162. This permits the spring 160 to shift the switch 142 back to the position shown in Fig. 4. Consequently, direct current is supplied through the brushes 170 and 172 and the motors are caused to stop in synchronism and in angular alignment.

Inasmuch as coil 178 is across lines 174 and 176, it is energized and opens the switch 136, the opening however being delayed by the dashpot 181 long enough for the armatures to be aligned. When switch 136 opens, it opens the circuit through holding coil 135 and consequently spring 119 moves plunger 117 upwardly to open switch 116.

While the motors illustrated in Figs. 1 through 4 have been described as being operated by direct current, they are shown as universal motors and hence will operate satisfactorily on either alternating or direct current. During positioning, if alternating current is employed, the polarities of the field poles are reversed in accordance with the frequency of the current, but at the same time the polarities of the relatively fixed poles established in the armatures are likewise reversed in the same manner and consequently, the armatures are positioned relative to their fields when using A. C. in the same manner as described for D. C. operation.

Figure 5:
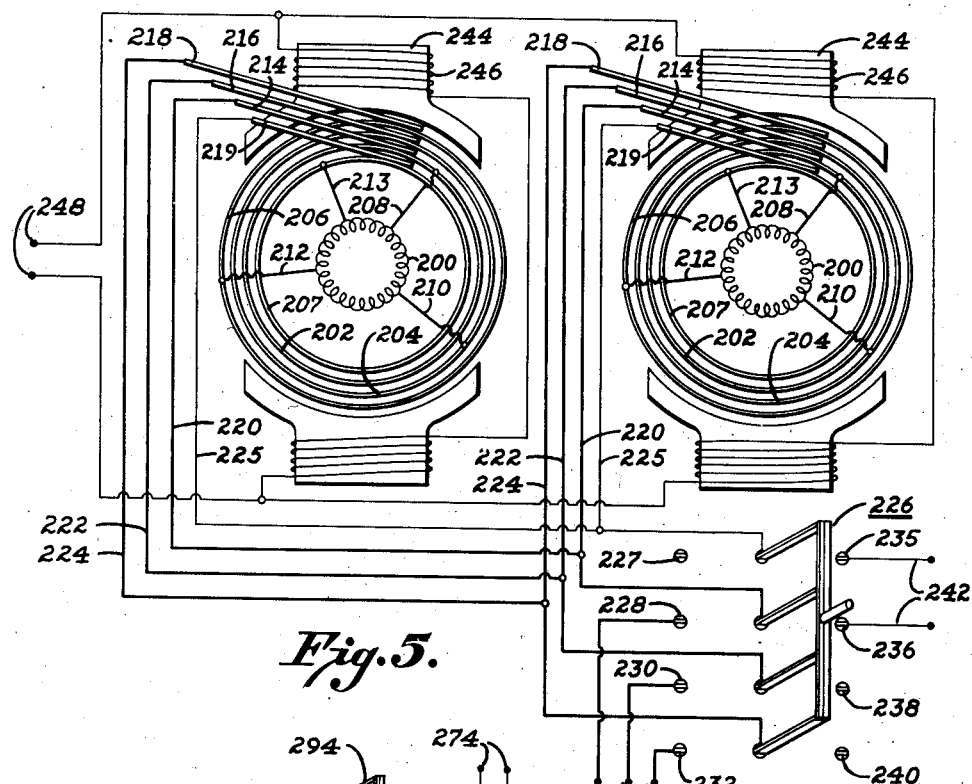
Fig. 5 is a wiring diagram illustrating a further embodiment of my invention as applied to synchronous motors.

Fig. 5 shows the application of my invention to a plurality of three-phase synchronous motors. Each motor includes a wound armature 200 provided with slip rings 202, 204, 206 and 207 of which the first three are connected through taps 208, 210 and 212, respectively, to the armature winding at points equally spaced around its circumference. Slip ring 207 is connected to the winding through a tap 213 which is spaced from the tap 208 a distance less than the width of the pole faces. Brushes 214, 216, 218 and 219 contact these slip rings and are connected to conductors 220, 222, 224 and 225, respectively. These conductors are connected to the blades of a four-pole, double-throw switch designated generally by reference character 226. This switch is provided with a set of contacts 227, 228, 230 and 232 on one side and a similar set 235, 236, 238 and 240 on the other side. The contacts 228, 230 and 232, which may be connected through the respective blades of the switch with the conductors 220, 222 and 224, are connected to the three-phase line 234, the contact 227 being dead.

The contacts 235 and 236, which may be connected through the switch to the conductors 225 and 220, are connected to a D. C. supply line 242, the contacts 238 and 240 of this set being dead.

Each motor is provided with a plurality of field poles 244, the windings 246 of which are connected in series and to a supply line 248 for direct excitation current, as is usual with a synchronous motor.

With the switch 226 in the left position, as viewed in Fig. 5, three-phase current is supplied from the line 234 to the conductors 220, 222 and 224 and through the brushes 214, 216 and 218, the slip rings 202, 204 and 206, and the taps 208, 210 and 212 to the armature winding 200 of each motor. The field being excited by direct current from the line 248 the several motors will run in synchronism in the usual manner.

If it is desired to stop the motors in synchronism and with the respective armatures in angular alignment, the switch 226 is thrown to the right position. Consequently, the three-phase supply to the armature is interrupted and direct current is supplied from the line 242 to the conductors 220 and 225, from where it passes through the brushes 214 and 219, the slip rings 202 and 207 and the taps 208 and 213 to the armature winding. This establishes poles in the armature in the same manner as occurs in the embodiment illustrated in Fig. 2. Inasmuch as the field coils 246 are excited by direct current, they constitute poles of unchanging polarity, with the result that the armature of each machine will be brought to rest with the north and south poles therein in alignment with the south and north poles, respectively, of the field. In the same manner, as described in connection with Fig. 2, the armatures of the several motors are stopped in synchronism and are accurately aligned angularly with respect to each other.

If desired, instead of providing the fourth connection 213 to the armature, the direct current from the line 242 could be supplied to any two of the conductors 220, 222 and 224.

Figure 6:
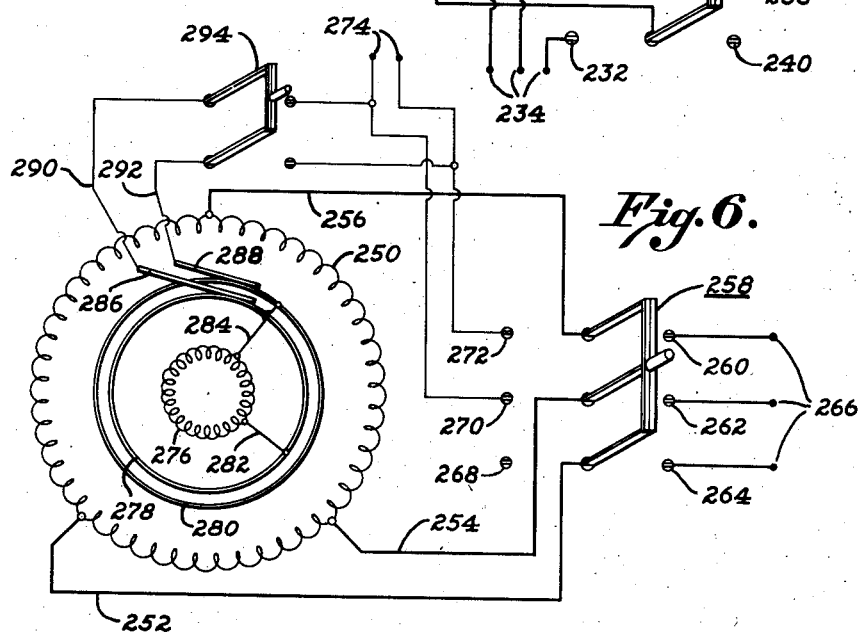
Fig. 6 is a wiring diagram showing my invention as applied to an induction motor.

Fig. 6 illustrates how my invention may be utilized to angularly align the armature of an induction motor before starting, or after stopping. Reference character 250 designates a three-phase stator which may be supplied with current through the conductors 252, 254 and 256. These conductors are connected to the blades of a triple-pole, double-throw switch 258, the poles 260, 262 and 264 of which are connected to the three-phase supply line 266. Any two of the other sets of poles 268, 270 and 272 are connected to a direct-current line 274.

The motor is provided with a wound rotor 276 having a pair of slip rings 278 and 280 connected to spaced points of the rotor winding by means of taps 282 and 284, respectively. Brushes 286 and 288 are associated with the slip rings and are connected by means of conductors 290 and 292 with the D. C. supply line 274, a double-pole, single-throw switch 294 being provided in the conductors 290 and 292.

In order to angularly position the rotor with respect to the stator, the switch 294 is closed in order to supply direct current to the rotor winding 276, to thereby establish poles therein. At the same time, the switch 258 is thrown to the left-hand position, as viewed in this figure, whereupon direct current is supplied through the conductors 254 and 256 to the stator winding 250. This serves to establish stationary poles of unchanging polarity in the stator and consequently the rotor is turned until the north and south poles therein are in alignment with the south and north poles, respectively, established in the stator.

During operation of the motor the switch 294 is open and the switch 258 is thrown to the right-hand position, thus supplying three-phase current to the stator, and the motor operates in the manner usual with three-phase induction motors.

While I have shown and described several embodiments of my invention, it is to be understood that this has been done for purposes of illustration only and the scope of my invention is not to be limited thereby, but is to be determined from the appended claims.

What I claim is:

1. In an electric motor, a stationary field, a rotatable armature, including an armature winding and a commutator, a pair of brushes associated with said commutator for supplying current to said winding, a slip ring carried by said armature and connected to said winding, a brush associated with said slip ring, means for energizing said field with direct current to thereby establish relatively fixed magnetic poles, and means for supplying direct current to one of the armature brushes and to the slip ring brush to thereby establish relatively fixed magnetic poles in said armature.

2. In an electrical system, a plurality of similar electric motors, each motor including a stator and a wound rotor having a commutator, a plurality of conductors providing an alternating current circuit connected to similar points in the windings of the several rotors, means for establishing relatively fixed magnetic poles in the several stators, means for connecting an electric circuit to said several rotor windings to establish relatively fixed magnetic poles therein, one side of said electric circuit being connectable to said windings through one of said conductors, and means operative alternatively with said last mentioned means for supplying the commutators of all of the motors with the same voltage.

3. In an electrical system, a plurality of similar electric motors, each motor including a stator and a wound rotor having a commutator, a plurality of conductors providing an alternating current circuit connected to similar points in the windings of the several rotors, means for establishing relatively fixed magnetic poles in the several stators, means for connecting an electric circuit to said several rotor windings through two of said conductors to establish relatively fixed magnetic poles in said rotors, and means operative alternatively with said last mentioned means for supplying the commutators of all of the motors with the same voltage.

4. In an electrical system, a plurality of similar electric motors, each motor including a stator, a wound rotor, a commutator and a pair of brushes associated with said commutator, a plurality of conductors providing an alternating current circuit connected to similar points in the windings of the several motors, means for establishing relatively fixed magnetic poles in the several stators, and means for connecting a direct current circuit to said several rotor windings to establish relatively fixed magnetic poles therein, one side of said direct current circuit being connected to said windings through one of said conductors and the other side being connected through one brush of each motor.

5. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, conductors connecting the slip ring brushes of the several motors to provide an alternating current circuit, means for exciting said field with direct current, a double-pole, double-throw switch, a source of direct current connected to said switch, and means for connecting the commutator brushes and two of said slip ring brushes of each motor to said switch so that in one position of the latter direct current is supplied to said rotor windings through the commutators and in another position direct current is supplied to the rotor windings through two of the slip rings.

6. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, conductors connecting the slip ring brushes of the several motors to provide an alternating current circuit, means for exciting said field with direct current, a double-pole, double-throw switch, a source of direct current connected to said switch, means for connecting the commutator brushes and two of said slip ring brushes of each motor to said switch so that in one position of the latter direct current is supplied to the rotor windings of the several motors through two of the slip rings and in another position is supplied to the rotor windings through the commutators, and means for automatically shifting said switch from the former to the latter position after it has occupied the former position a predetermined period.

7. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, conductors connecting the slip ring brushes of the several motors to provide an alternating current circuit, means for exciting said field with direct current, a double-pole, double-throw switch, a source of direct current connected to said switch, means for connecting the commutator brushes and two of said slip ring brushes of each motor to said switch so that in one position of the latter direct current is supplied to the rotor windings of the several motors through two of the slip rings and in another position is supplied to the rotor windings through the commutators, a holding coil associated with said switch and connected across said source of direct current for shifting said switch from the former to the latter position and for holding the switch in the latter position, and means for delaying the shifting of said switch for a predetermined period after said coil has been energized.

8. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, conductors connecting the slip ring brushes of the several motors to provide an alternating current circuit, means for exciting said field with direct current, a double-pole, double-throw switch, a source of direct current connected to said switch, means for connecting the commutator brushes and two of said slip ring brushes of each motor to said switch so that in one position of the latter direct current is supplied to the rotor windings of the several motors through two of the slip rings and in another position is supplied to the rotor windings through the commutators, means for biasing said switch to the former position, a holding coil connected across said source of direct current for shifting said switch from said former to the latter position and for holding the switch in the latter position, means for delaying the shifting of said switch for a predetermined period after said coil has been energized, and a manually operable switch for de-energizing said coil.

9. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, conductors connecting the slip ring brushes of the several motors to provide an alternating current circuit, means for exciting said field with direct current, a double-pole, double-throw switch, a source of direct current connected to said switch, means for connecting the commutator brushes and two of said slip ring brushes of each motor to said switch so that in one position of the latter direct current is supplied to the rotor windings of the several motors through two of the slip rings and in another position is supplied to the rotor windings through the commutators, means for biasing said switch to the former position, a holding coil connected across said source of direct current for shifting said switch from said former to the latter position and for holding the switch in the latter position, a manually closable switch in the circuit between said holding coil and said source, a holding coil connected in series in said circuit for maintaining the last-mentioned switch closed when current is flowing in the circuit, means for delaying the shifting of said double-pole, double-throw switch for a predetermined period after the first-mentioned holding coil has been energized, and a manually openable switch for de-energizing said first-mentioned coil when said manually closable switch is closed.

10. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, conductors connecting the slip ring brushes of the several motors to provide an alternating current circuit, means for exciting said field with direct current, a double-pole, double-throw switch, a source of direct current connected to said switch, means for connecting the commutator brushes and two of said slip ring brushes of each motor to said switch so that in one position of the latter direct current is supplied to the rotor windings of the several motors through two of the slip rings and in another position is supplied to the rotor windings through the commutators, means for biasing said switch to the former position, a holding coil connected across said source of direct current for shifting said switch from said former to the latter position and for holding the switch in the latter position, a manually closable switch in the circuit between said holding coil and said source, a holding coil connected in series in said circuit for maintaining the last-mentioned switch closed when current is flowing in the circuit, means for delaying the shifting of said double-pole, double-throw switch for a predetermined period after the first-mentioned holding coil has been energized, a normally closed switch in said circuit, a holding coil connected across said two of said slip ring brushes for opening said normally closed switch, means for delaying the opening thereof for a period greater than said predetermined period, and a manually openable switch for de-energizing said first-mentioned coil when said manually closable switch is closed.

11. A plurality of rotary converters, means providing a three phase connection between the alternating current sides of said converters, means to apply direct current to the direct current sides of said converters, and means operable on removal of the direct current from said direct current sides of the converters to apply direct current to one phase of said three phase connection.

12. A plurality of direct current motors, means to position said motors in the same relative phase angle position, means to accelerate said motors synchronously, means to maintain said motors in synchronism while running, and means dynamically to brake said motors in synchronism.

13. A source of electric power, an electric motor, means to connect said source to the motor in such a manner as to cause the motor to operate, first switch means for controlling the last-mentioned means, electric means to position the motor in a desired position, means to connect said source to said electric means, second switch means for controlling the last-mentioned means, electric means to brake the motor, means to connect said source to the last-mentioned means, switch means for controlling the last-mentioned connecting means, and manual means responsive to a single movement by an operator for successively actuating said second switch means and said first switch means and responsive to another single movement by an operator for successively actuating the first switch means and the switch means for controlling the brake means and the second switch means.

14. A source of electric power, an electric motor, a first circuit for connecting said source to the motor in such a manner as to cause the motor to operate, first switch means for controlling said circuit, electric means for positioning the motor in a desired position, a second circuit for connecting said source to said electric means, second switch means for controlling said second circuit, electric means for dynamic braking of the motor, a dynamic braking circuit, switch means for controlling said braking circuit, and manual means responsive to a single movement by an operator for successively actuating said second switch means and said first switch means and responsive to another single movement by an operator for first actuating the first switch means and then actuating the second switch means and the switch means for controlling said braking circuit.

15. A source of electric power, an electric motor, a first circuit for connecting said source to the motor in such a manner as to cause the motor to operate, first switch means for controlling said circuit, electric means for positioning the motor in a desired position, a second circuit for connecting said source to said electric means, second switch means for controlling said second circuit, electric means for dynamic braking of the motor, a dynamic braking circuit, said second switch means controlling said braking circuit, and manual means responsive to a single movement by an operator for successively actuating said second switch means and said first switch means and responsive to another single movement by an operator for successively actuating the first switch means and the second switch means.

16. In an electrical system, a plurality of electric motors having wound rotors, means for permanently electrically connecting like points in the rotors of the several motors, means for establishing electrical connections for positioning the rotating parts of the several motors in the same relative angular positions before the motors are started, means for establishing other electrical connections for synchronously accelerating said motors from rest to normal operating speed, said last-mentioned electrical connections also serving for running said motors in synchronism, and means for reestablishing the first-mentioned electrical connections for synchronously decelerating said motors from normal operating speed to rest.

17. In an electrical system, a plurality of electric motors having wound rotors, means for permanently electrically connecting like points in the rotors of the several motors, means for establishing electrical connections for supplying direct current to position the rotating parts of the several motors in the same relative angular positions with respect to each other and in predetermined positions with respect to the stationary parts of the motors before the motors are started, means for establishing other electrical connections for synchronously accelerating said motors from rest to normal operating speed, said last-mentioned electrical connections also serving for running said motors in synchronism, and means for reestablishing the first-mentioned electrical connections for synchronously decelerating said motors from normal operating speed to rest.

18. In an electrical system, a plurality of electric motors, electric means for positioning the rotating part of each motor in the same angular position relative to the fixed part thereof as the rotating parts of the remaining motors relative to their respective fixed parts before the motors are started, means to apply the same voltage to the different motors to cause the motors to start and run, and means providing a path for the flow of synchronizing alternating currents between the motors.

19. A plurality of direct current motors, means connecting like fixed points on the armature windings of said motors, direct current means for positioning the armature of each motor in the same position with respect to its field as the armatures of the remaining motors relative to their respective fields, and means to apply the same voltage to each of the motors to cause them to start and run.

20. A plurality of electric motors, means connecting like fixed points on the armature windings of said motors, means for applying electric current to said first-mentioned means for positioning the armature of each motor relative to the field thereof in the same position as the armatures of the remaining motors relative to their respective fields before they are started, and means to apply the same voltage to each of the motors to cause them to start and run.

21. In an electrical system, a plurality of electric motors, each motor including a stator and a wound rotor having a commutator, a plurality of conductors providing an alternating current circuit connected to similar points in the windings of the several rotors, means for establishing relatively fixed magnetic poles in the several stators, means for supplying electric current, means for connecting said supply means to two of said conductors to impress a potential on the several rotor windings to establish relatively fixed magnetic poles in said rotors, and means operative alternatively with said last-mentioned means to connect said supply means to said commutators to impress the same voltage on each of the several rotor windings to create a rotating magnetic field therein.

22. A plurality of direct current motors each having a field winding and an armature winding, means interconnecting fixed taps taken from the armature winding of each motor, a commutator for each armature winding, means to apply direct current electric power to the commutator of each motor, and means to apply direct current electric power to the means interconnecting the fixed taps when the means connecting the commutators to direct current electric power have been disconnected but while the motors are still running to decelerate the motors in synchronism and to stop them with the armature of each motor positioned relative to the field thereof in the same position as the armatures of the remaining motors relative to their respective fields.

ERIC C. WAHLBERG.